April 20, 1926.
H. A. SOREL
1,581,235
FINGER EXERCISING DEVICE
Filed March 26, 1921
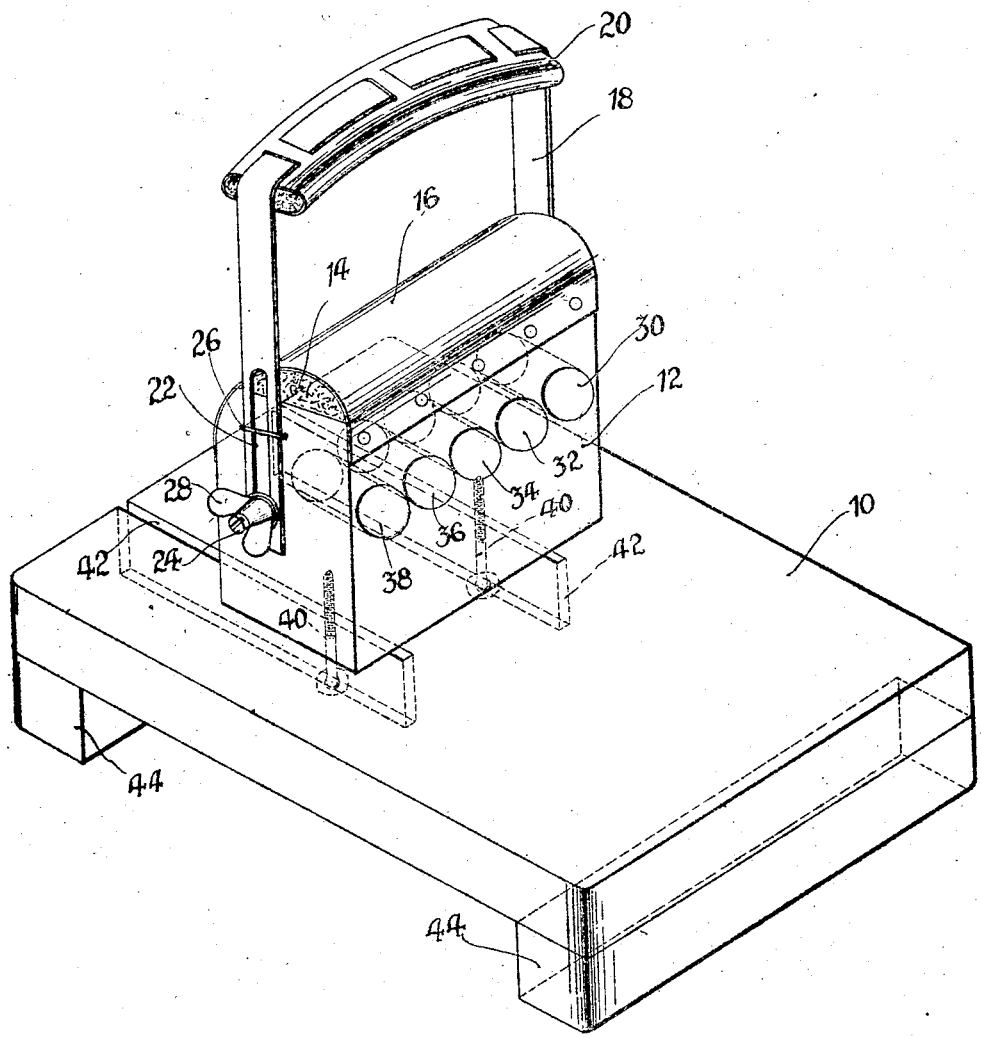
Inventor
Henry A. Sorel Patented Apr. 20, 1926.

1,581,235

UNITED STATES PATENT OFFICE.

HENRY A. SOREL, OF CHICAGO, ILLINOIS.

FINGER-EXERCISING DEVICE.

Application filed March 26, 1921. Serial No. 455,755.

*To all whom it may concern:*

Be it known that I, HENRY A. SOREL, a citizen of the United States, residing at Chicago, in the county of Cook and State of Illinois, have invented a certain new and useful Improvement in Finger-Exercising Devices, of which the following is a full, clear, concise, and exact description, reference being had to the accompanying drawings, forming a part of this specification.

My invention relates to apparatus for the assistance of students of typewriting and their instructor, and more specifically to an improved device for facilitating the cultivation of free movement of the fingers of the operator's hand.

One object of my invention is to provide a device by means of which the various muscles of the arm and hand of the student may be held to restrain them from movement or released to perform specified movements and restraining other movements, to assist in the development of various muscles and to help the student to acquire improved control of the motor nerve leading to those muscles and the muscles themselves.

Another object of my invention is to provide a very simple device for accomplishing the purposes above outlined, which device comprises a minimum number of parts, cheap to manufacture, easy to assemble and durable in practice.

Further objects and advantages of my invention will become apparent in the description and claims.

The accompanying drawing shows a perspective view of one of the preferred embodiments of my invention.

In the embodiment of my invention selected for illustration, a base 10 supports a block 12 suitably shaped for engagement on its upper surface with the palm of the hand. For this purpose simple upholstering is preferably provided on the upper side of the block 12 such as the filling 14 and the retaining cover 16. The hand of the user of the device is laid over the block 12 and clamped thereto in such a manner as to restrain movement of the wrist or shoulder joint, at least in so far as such movement might result in a displacement of the hand or of the fingers projecting past the block 12. Suitable clamping means has been illustrated in the nature of a U-shaped metal clip 18 carrying a pad 20 to engage the back of the hand and slotted as at 22 to receive a guide bolt 24. A shackle 26 holds the clip 18 upright, and a wing nut 28 may be employed to clamp the clip in adjusted position.

The front face of the block 12 contains a series of five holes 30, 32, 34, 36 and 38, spaced below the top of the block in suitable position to receive the fingers of the hand of the student. In using the device illustrated on the right hand of the student the index finger will enter hole 32, the second finger hole 34, the third finger hole 36, and the fourth or little finger hole 38. The student may now withdraw one finger at a time from its corresponding hole and exercise the same by moving it about freely while the other fingers are held rather firmly against any movements whatever by engagement with the holes in which they are entered. It is thus possible for the student in a relatively short length of time to acquire much better control of the individual muscles and the movements of the individual fingers than could be accomplished by ordinary typewriting work continued for almost any length of time.

In the touch system using the standard key board, the first or index finger of each hand is used for two keys in each row so that it must often be thrown sideways from the rest of the fingers to engage the extra key. After sufficient facility in the movement and control of the individual fingers has been acquired, additional practice in throwing the hand into the position for operating the extra keys with the index finger may be accomplished by slipping the index finger into hole 30 instead of hole 32. This will space the fingers substantially as they should be spaced if the student's hands were resting on the keyboard of a typewriter, and additional finger exercises with the hand in this position will soon strengthen the index finger and accustom it to its work.

The same device may be employed for exercising the left hand except that, obviously, the little finger of the left hand will enter hole 30, the third finger hole 32, the second finger hole 34 and the first or index finger will be used in holes 36 and 38.

Longitudinal adjustment of the block 12 is preferably but not necessarily provided to accommodate variations in the length of the operator's arm. I have illustrated holding screws 40 passing through slots 42 in the base 10 to clamp the block 12 in longitudinally adjusted position. The base 10 is preferably spaced from the desk or other supporting surface upon which the device rests, by end pedestals 44.

While I have illustrated and described in detail a preferred embodiment of my invention and indicated the method in which I propose to use it, it should be clearly understood that the description and indication of use are only for purposes of illustration and that many modifications of the device and many other uses for the same will be apparent to those skilled in the art. It will for instance, be obvious that students of the piano may readily find the exercise of the fingers and development of the muscles obtainable with my improved device, distinctly advantageous. I aim in the appended claims to cover all legitimate variations and modifications of my device and all proper methods of using the same.

I claim:

1. In an educational appliance, in combination, a block adapted to receive the palm of the hand of the operator, means for clamping the operator's hand is position on said block, said block having a series of holes along its front face to receive the ends of the fingers of the operator's hand.

2. In an educational appliance, in combination, a block adapted to engage the palm of the hand of the operator, means for clamping the operator's hand in position on the block, said block having a series of holes along its front face to receive the fingers of the operator's hand, said holes being greater in number than the fingers of one hand, whereby different spaced relationships of the fingers may be attained by shifting them from one hole to another.

In witness whereof, I hereunto subscribe my name this 23rd day of March, 1921.

HENRY A. SOREL.